April 10, 1962     J. A. WALKER     3,028,630
DIE APPARATUS AND METHOD FOR MOULDING FLEXIBLE TUBES
Filed April 18, 1960
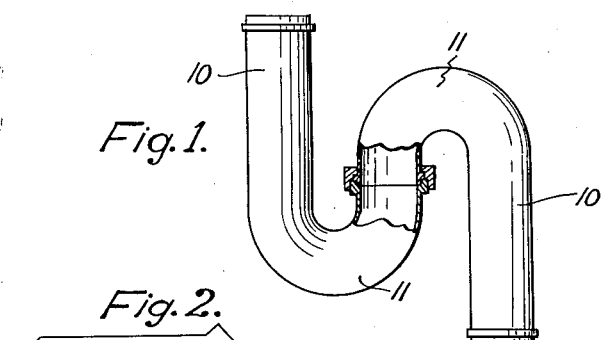
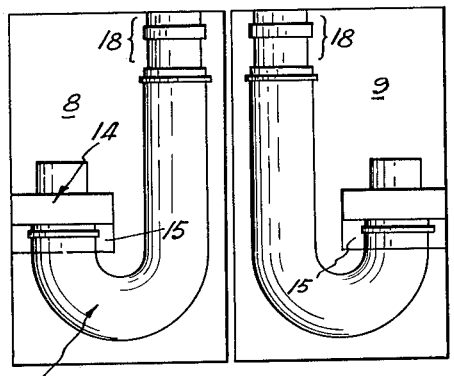
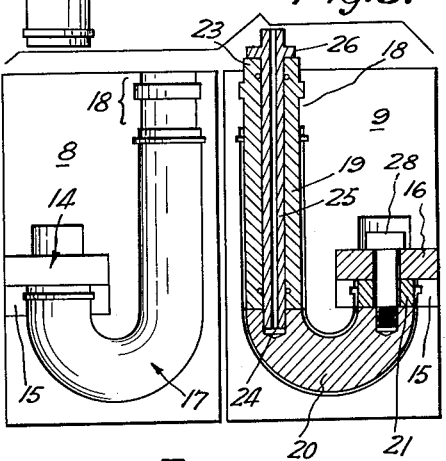
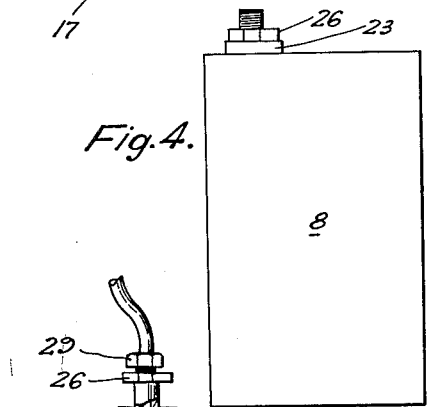
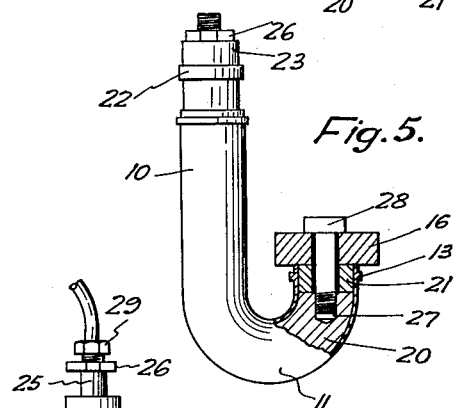
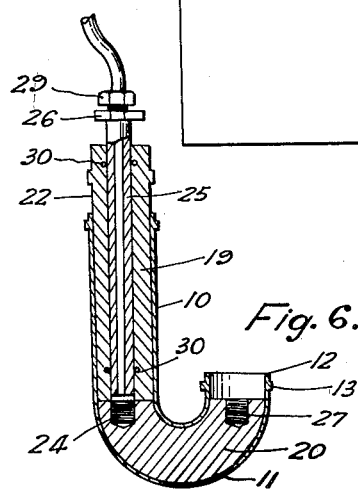
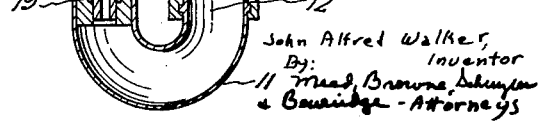
John Alfred Walker,
Inventor
By: Mead, Browne, Schuyler
& Beveridge - Attorneys United States Patent Office 3,028,630
Patented Apr. 10, 1962

3,028,630
DIE APPARATUS AND METHOD FOR MOULDING FLEXIBLE TUBES
John Alfred Walker, Rockdale, near Sydney, New South Wales, Australia, assignor to J. A. Walker & Co. Pty. Limited, Rockdale, near Sydney, New South Wales, Australia
Filed Apr. 18, 1960, Ser. No. 22,828
Claims priority, application Australia Apr. 22, 1959
4 Claims. (Cl. 18—42)

This invention relates to the moulding of flexible tubes which comprise a straight portion and a curved portion, such tubes are herein referred to as "J-tubes."

J-tubes are often used in plumbing, for example, two J-shaped tubes may be secured end to end to form an S-trap in a drain pipe or the like and, by way of example, the present invention is described herein mainly as applied to the manufacture of such a J-shaped drain pipe portion.

It has been proposed to mould J-tubes from polythene or like flexible, chemically stable plastics material instead of from iron, lead or other conventional inflexible materials. It is preferable when moulding a plastics article to use injection or transfer moulding techniques, and, as is well understood, this necessitates the use of hard metal moulds and cores, or dies. However, a J-shaped core of solid metal or the like cannot be withdrawn from a moulded J-tube, and accordingly when making J-tubes from flexible plastics material it has been usual to mould the tube's shank (straight) portion and its curved end portion as separate pieces and to provide means for securing these two pieces together to form a composite J-tube. This method of making a J-tube is objectionable in that two separate moulding operations are inherently more costly than one, and also in that the joint between the two tube portions is expensive and time consuming to make.

Accordingly the main object of the present invention is to provide an injection or transfer moulding die apparatus and method by which a J-tube of flexible material may be rapidly and conveniently moulded in one piece.

The invention may be summarised as consisting in die apparatus for use in moulding flexible J-tubes in one piece, comprising an outer die in two halves having mutually registrable J-shaped cavities in their mating faces and being furnished with means for injecting fluid moulding material into the die space constituted by said cavities when mated, and a J-shaped core adapted to be concentrically supported inside said die space, said core comprising a straight portion, a curved portion and means for separably joining said portions together in axial continuity.

An example of the invention is illustrated in the drawings herewith.

FIG. 1 illustrates an S-trap consisting of two J-tubes joined together in axial continuity.

FIG. 2 shows an empty outer die opened out to show the mating faces of its two halves and the J-shaped cavities therein.

FIG. 3 repeats FIG. 2 but adds a J-shaped core emplaced ready for moulding a J-tube such as one of the two shown in FIG. 1.

FIG. 4 shows the die apparatus of FIG. 3 closed up ready for the moulding operation.

FIGS. 5 to 7 are each partly sectioned side elevations of a moulded J-tube, and illustrate the progressive stages in the removal of the core therefrom.

In a practical embodiment of the invention an outer die is provided which may be of hard steel and comprises two halves 8 and 9 which, when placed together (FIG. 4) constitute the walls of a die cavity conforming in shape to at least part of the outer surface of a J-tube, comprising straight portion 10 and curved portion 11.

If the open end of the curved portion of the J-tube is simply a plain end, the outer die cavity could conform to the entire outer surface of the tube, usually however, that J-tube end is provided with a short straight portion 12 provided with an outer screw thread, a flange 13 or like conventional connector means whereby two J-tubes, for example, may be joined together to form an S-trap as shown in FIG. 1. Accordingly the cavity within the outer die usually includes a slot or well portion 14 in which may be housed, firstly two (split) loose pieces 15 which together define a mould surface conforming to the outer surface of the mentioned connector means, and secondly an ejector block 16 adapted to hold the loose pieces 15 in their operative position, that is, the position in which the cavity between the loose pieces 15 constitutes a smooth extension of the main die cavities 17 in the outer die halves 8 and 9.

In the remaining description it is assumed that the apparatus is for moulding J-tubes having to be provided with connector means at the free ends of the curved portions 9, it being thought that the modifications to the die apparatus (the omission of loose pieces and ejector block) that may be used when no such means are required will be clearly apparent to one skilled in the art.

The outer die cavity includes a core print clamping portion 18 extending to the outside of the outer die from that portion of the outer die cavity which corresponds to the free end of the J-tube shank.

A composite core (of hard steel, for example) may thus be clamped between the outer die halves to project concentrically into the cavity therein, to define the inner surface of the J-tube during moulding thereof. The composite core as illustrated comprises three portions, a straight shank part 19 for moulding the shank portion of the J-tube, a curved part 20 for the curved portion of the J-tube and an end connector washer core 21 to act as core inside the loose pieces 15.

The straight core portion 19 has an end print 22 which is clamped between the outer die halves and one end 23 protrudes therefrom. The straight shank core portion has a bolt hole extending through it from end to end, and a threaded hole 24 in one end of the curved core portion permits it to be secured to the straight portion by a tubular bolt 25 able to extend through said bolt hole with its head 26 abutting the projecting end face of the straight core portion 23 outside of the outer die.

A second threaded hole 27 may be provided in the other end of the curved core portion to receive one end of a clamp bolt 28 which, when tightened, clamps the end connector core washer 21 between the ejector block 16 and the curved core portion 20.

Thus, when the three core portions have been bolted together, they and the ejector block together with the loose pieces 15 may be clamped within the outer die cavity (by clamping or otherwise holding the outer die halves together in known manner) to form a complete mould for the J-tube. The fluent plastics material may be then introduced into the outer die cavity in conventional manner to form a J-tube about the cores.

The release of the J-tube from the mould and the extraction of the cores from the J-tube may then be effected as follows.

The outer die halves are first separated and the J-tube, with the core in it, is simply lifted therefrom (see FIG. 5). The clamp bolt 28 is unscrewed whereupon the ejector block 16 and the end connector core washer 21 may be removed (see FIG. 6). The tubular bolt 25 is then unscrewed so as to be free of the curved core portion 20, and (by means of a suitable hose-connector 29 secured to the tubular bolt head) high pressure air, from any suitable source thereof, is introduced into the tubular bolt interior.

The tubular bolt 25 is a substantially air tight sliding fit within the straight shank core portion bolt hole, one or more rubber O-rings 30 or the like may be housed within a peripheral groove (or grooves) in the bolt hole to ensure airtightness, thus the high pressure air "blows" the curved core portion 20 out of the J-tube. It will be seen that when the curved core 20 is being blown out of the moulded J-tube, there is a tendency for the shank core portion 19 and or the belt 25 also to be blown out; but this tendency can be restrained by holding the moulding, portion 19 and bolt 25 together by any suitable means. In practice it has been found that the operator can easily hold these parts together by hand. It will be appreciated that the flexible plastics J-tube will be deformed somewhat as the curved core portion is ejected, but it has been found that such deformation is not permanent. The open end of the J-tube may then be sealed with a screwed or clamped on cap 31 or the like whereupon the air pressure forces the straight shank core portion 19 from the J-tube.

The various core parts may then be re-assembled for a further moulding operation; or, if desired, a plurality of core assemblies may be provided so that while one core is being stripped another may be in use within the outer die.

It will be appreciated that the above described use of compressed air to get the core portions out of the moulded J-tube is much preferred; however, other and even very much simpler means may be employed. For example, the bolt used to join the straight and curved portions of the core together may be an ordinary solid bolt, which upon removal from the core will permit the straight portion of the core to be forcibly pulled out of the J-tube. This will then allow a rod to be entered into the straight part of the J-tube with a view to poking or pushing the curved core portion out of the J-tube. Alternatively, an eye-bolt may be applied to the screwed hole 27, and this can then be hauled upon to get the core part 20 out of the J-tube. This process will be found not too difficult notwithstanding the fairly extensive deformation of the curved portion of the J-tube which is necessary. This deformation can however be kept to a minimum by so hauling upon the core part 20 as to cause it, as far as possible, to follow a path in circular continuity of its own arcuate centre line.

I claim:

1. Apparatus for moulding J-tubes in one piece, comprising an outer die in two halves having mutually registrable J-shaped moulding chambers in their mating faces, a J-shaped core concentrically supported inside the moulding chamber formed by said mating faces and defining a moulding cavity with said moulding chamber, said J-shaped core being supported within said moulding chamber only at the outer ends of said core, said core comprising a straight portion, a curved portion and means for separably joining said portions together in axial continuity, said means for separably joining said core portions together comprising a tubular bolt extending through said straight core portion and secured to said curved core portion, said bolt having a bore passing longitudinally therethrough, means for injecting a fluid moulding material into the moulding cavity defined by said core and said chambers when mated, and means enabling a source of fluid under pressure to be fed into the bore of said bolt to enable at least said curved core portion to be blown out of a J-tube moulded thereabout.

2. Apparatus according to claim 1 which includes a cap applicable to the free end of the curved portion of the J-tube thus to enable the moulded J-tube to be blown off of the straight core portion.

3. A method of moulding a hollow J-shaped tubular body having a straight portion and a curved portion, comprising the steps of forming a moulding chamber, concentrically supporting a core having a straight portion conforming to the straight portion of the tubular body and a curved portion conforming to the curved portion of the tubular body in said mould chamber at each end of the core only to form a moulding cavity, injecting moulding material into said cavity and allowing the moulding material to solidify therein, removing said core and solidified material from said moulding chamber, separating said core at the point where the straight portion thereof joins the curved portion thereof, releasing the support on the end of the core forming the curved part, introducing a high pressure fluid medium between the separated core portion to cause the unsupported curved core portion to move out of the corresponding curved portion of the J-shaped body, sealing the end of said J-shaped body from which the curved core portion has been removed, and then introducing a high pressure fluid medium into the space in the J-shaped body left by the said curved core portion and force the straight core portion out of the straight portion of said J-shaped body.

4. A method of moulding a hollow tubular body having straight portion integral with a curved portion, comprising the steps of forming a moulding chamber, concentrically supporting a two-piece core having a straight part conforming to the straight portion of the tubular body releasably secured to a curved part conforming to the curved portion of the tubular body in said moulding chamber at each end of the core only to form a moulding cavity with said moulding chamber, injecting moulding material into said cavity and allowing the moulding material to solidify therein, removing the core and solidified material from said moulding chamber, unsecuring said core parts, releasing the support at one end of the core, introducing a high pressure fluid medium at the juncture between the core parts to cause one of the core parts to move out of its corresponding position of the tubular body, sealing the end of the tubular body from which a core part has been removed, and then introducing a high pressure fluid medium into the space in the tubular body left by the removed core part to force the other core part out of its corresponding portion of the tubular body.

References Cited in the file of this patent
UNITED STATES PATENTS

| | | |
|---|---|---|
| 362,624 | Heiss | May 10, 1887 |
| 1,347,575 | Bungay | July 27, 1920 |
| 2,181,257 | Arbogast | Nov. 28, 1939 |
| 2,361,026 | Greene | Oct. 24, 1944 |
| 2,396,406 | Anderson | Mar. 12, 1946 |
| 2,486,870 | Nolan | Nov. 1, 1949 |